(12) United States Patent
Taylor (10) Patent No.: US 7,118,041 B2
(45) Date of Patent: Oct. 10, 2006

(54) TWO-DIMENSIONAL COLOR BARCODE WITH PRESERVED PLANE AND LOSSY PLANE LAYERS

(75) Inventor: Clark Taylor, La Jolla, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 212 days.

(21) Appl. No.: 10/833,589

(22) Filed: Apr. 27, 2004

(65) Prior Publication Data

US 2005/0236484 A1 Oct. 27, 2005

(51) Int. Cl.
*G06K 7/10* (2006.01)
(52) U.S. Cl. ............... 235/462.09; 235/462.01; 235/462.04
(58) Field of Classification Search ........... 235/462.09, 235/462.04, 462.01
See application file for complete search history.

(56) References Cited

U.S. PATENT DOCUMENTS

| 4,891,254 | A | * | 1/1990 | Bianco ................. 428/68 |
| 5,369,261 | A | | 11/1994 | Shamir |
| 6,082,778 | A | * | 7/2000 | Solmsdorf ............. 283/82 |
| 6,119,943 | A | * | 9/2000 | Christy ................ 235/468 |
| 6,124,970 | A | * | 9/2000 | Karassev et al. ....... 359/485 |
| 2005/0001376 | A1 | * | 1/2005 | LaPorte et al. ........ 273/269 |

FOREIGN PATENT DOCUMENTS

WO    WO 98/45799    10/1998

* cited by examiner

*Primary Examiner*—Ahshik Kim (57) ABSTRACT

The present invention is embodied in a barcode system that includes an encoder configured to create a two-dimensional color barcode representing data defined by a first data layer and a second data layer, wherein the first data layer is preserved and the second data layer is lost during black and white copying of the color barcode.

35 Claims, 5 Drawing Sheets

TWO-DIMENSIONAL COLOR BARCODE WITH PRESERVED PLANE AND LOSSY PLANE LAYERS

BACKGROUND

Early barcodes were typically one-dimensional ("1-D") barcodes containing a series of vertical black lines separated by white spaces which contained information readable by handheld or other types of scanners. The amount of information which could be recorded by a 1-D barcode in a given area was limited. This led to the development of black and white two-dimensional ("2-D") barcodes, which were often just a series of stacked 1-D barcodes still constrained as to the amount of data they could carry. To carry more data, color 2-D barcodes were developed. While 2-D color barcodes carry a greater amount of information than traditional black and white 2-D barcodes, when photocopied using a traditional black and white copy process, the 2-D color barcodes exhibit unknown loss characteristics which destroy the data information originally stored in the 2-D color barcode.

SUMMARY

The present invention is embodied in a barcode system that includes an encoder configured to create a two-dimensional color barcode representing data defined by a first data layer and a second data layer, wherein the first data layer is preserved and the second data layer is lost during black and white copying of the color barcode.

BRIEF DESCRIPTION OF THE DRAWINGS

The present invention can be further understood by reference to the following description and attached drawings that illustrate the embodiment(s). Other features and advantages will be apparent from the following detailed description of the embodiment(s), taken in conjunction with the accompanying drawings, which illustrate, by way of example, the principles of the invention.

DETAILED DESCRIPTION OF THE EMBODIMENTS

In the following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Figure 1A:
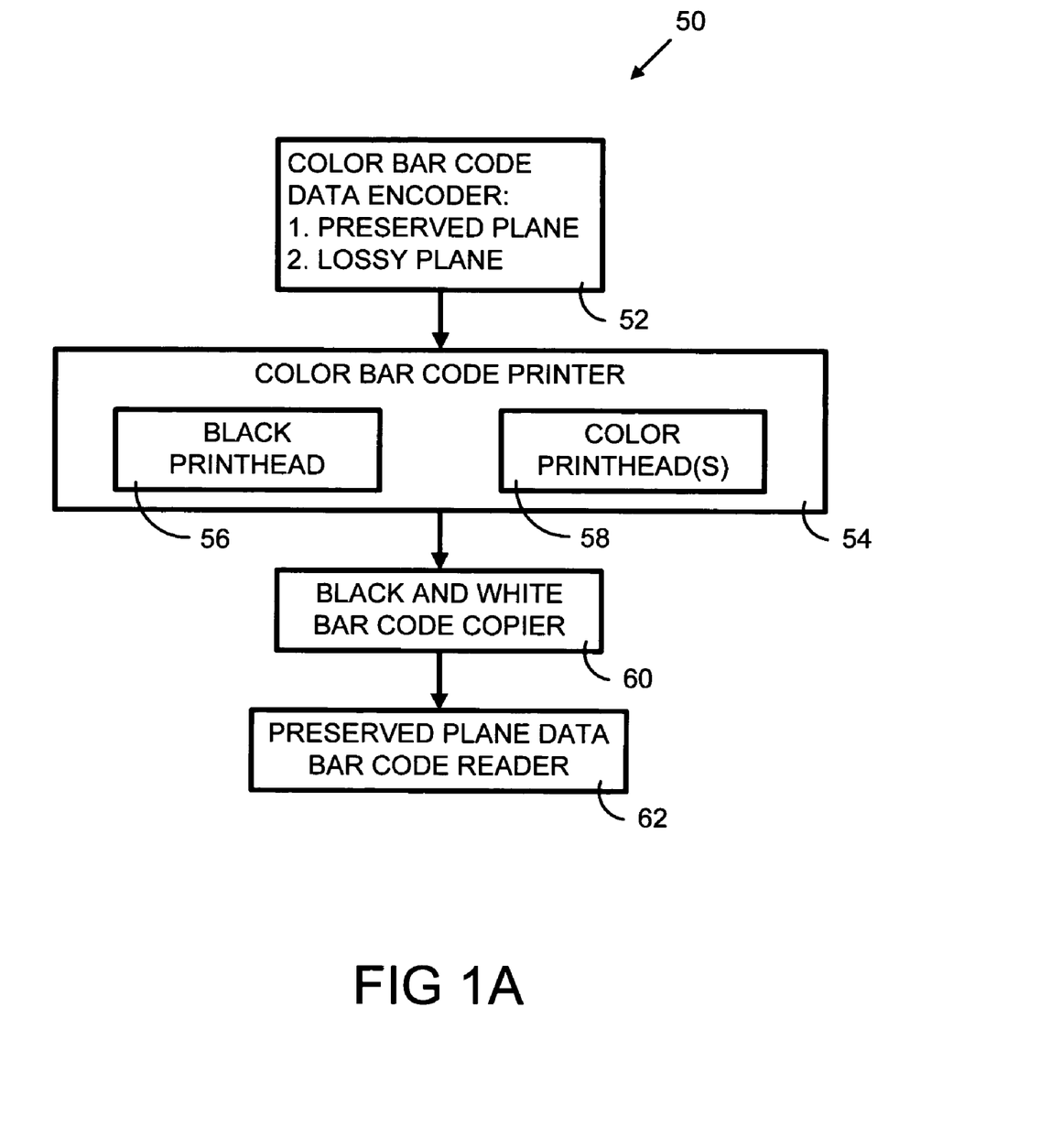
FIG. 1A is a block diagram of one embodiment of a barcode system with known characteristics following copying.

I. General Overview:

FIG. 1A illustrates one embodiment of barcode system 50 that includes an encoder 52 configured to create a two-dimensional color barcode representing data defined by a first data layer and a second data layer, wherein the first data layer is preserved and the second data layer is lost during black and white copying of the color barcode. The first data layer is a Preserved Plane of data having known characteristics following copying. The second data layer is a Lossy Plane having data that is known to be lost following copying, as described in greater detail below. A color barcode printer 54 can be used to print data from the encoder 52 as an original color barcode, with the printer using a black printhead 56 and one or more color printheads 58. Once printed, the color barcode may be copied by a black and white barcode copier 60, resulting in a black and white barcode image of the original color barcode. The black and white barcode image contains information from the Preserved Plane of data; however, information stored in the Lossy Plane of data is lost during the black and white copying process. A barcode reader 62 can be used to read the Preserved Plane of data, whether the reader 62 is a color reader or a standard black and white reader. In another embodiment, the black and white copier 60 may be eliminated, and data in the Preserved Plane of the original color barcode may be read directly by the preserved plane data barcode reader 62.

Figure 1B:
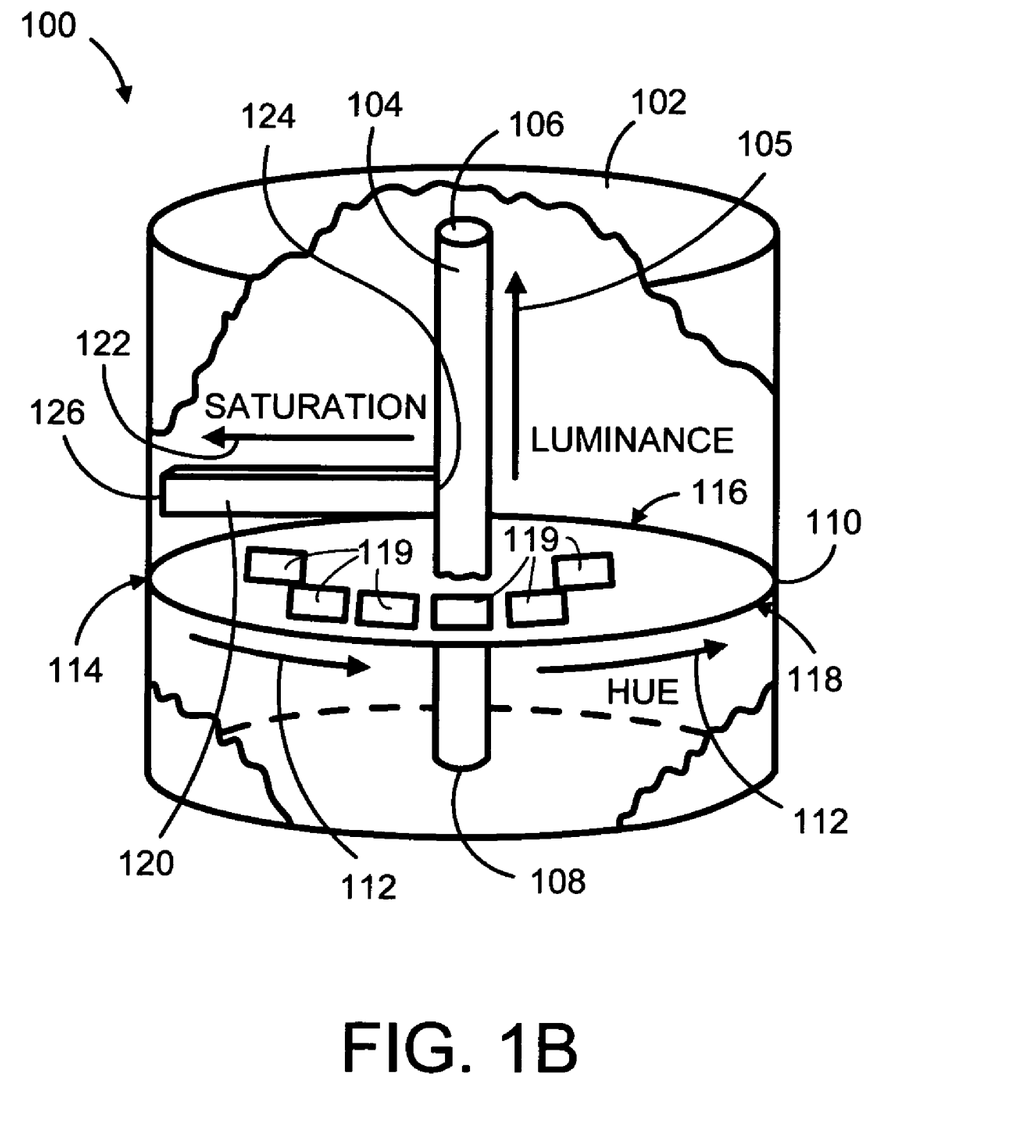
FIG. 1B is a diagram of hue, saturation and luminance color space.

II. Color Space Planes Layers:

FIG. 1B shows one embodiment representing full color space as a cylindrical full color space 100, although other geometric symbols may be used in other embodiments. While color information may be described in several different ways, this embodiment describes color information in terms of hue, saturation and luminance color space. The illustrated color space 100 includes conical boundaries 102 and a longitudinal luminance axis 104. Various luminance values along axis 104 may be found using a luminance scale 105 which extends between a maximum luminance end 106 and an opposing minimum luminance end 108. The maximum luminance end 106 is white and the minimum luminance end 108 is black, with the remainder of axis 104 being a gradual transition of grays between these ends. Thus, the luminance axis 104 represents the brightness of a printed pixel.

The full color space 100 has hue color planes perpendicular to the luminance axis 104 which may be represented as stacked disks running along the length of the axis, such as hue plane 110 which is similar to a color wheel used by artists. The various colors which may be selected from the hue plane 110 may be represented by the radial or angular position around the disk, as indicated by the curved arrows indicating a hue radial scale 112. For example, the hue plane 110 includes a red region 114, a green region 116, and a blue region 118. Thus, various positions 119 around scale 112 of the hue plane 110 may be used to represent the color of a printed pixel.

There are two different common ways of representing color, one known as an additive system represented by the colors red, green and blue (RGB), and the other known as a subtractive system, represented by the colors cyan, yellow and magenta (CYM). As examples, the additive RGB system is used on color computer displays, whereas the subtractive CYM system is used in formulating inks for inkjet color printing systems. Various processes for converting between the RGB and CYM systems are known to those of ordinary skill in the printing and copying arts. Hue, saturation and luminance are another way of representing color space.

The full color space 100 also has saturation axes running along the radial for each color on the hue planes, such as saturation axis 120 shown for the red region 114 of hue plane 110. Various locations along the saturation axis 120 may be identified using a saturation scale 122, which runs between a minimum saturation end 124 and a maximum saturation end 126. At the minimum end 124, the color is gray which represents an equal mixture of all colors within hue plane 110, with the color being more pure as it approaches the maximum saturation end 126. Thus, the saturation axis 120 represents the purity of a color.

The luminance scale 105, the hue scale 112, and the saturation scale 122 in the illustrated embodiment are each divided into 256 increments for a range of zero to 255 which is useful for binary encoding. At the minimum ends 108, 124 of the luminance and saturation scales 105, 122 (respectively), the value zero is assigned, while at the maximum ends 106, 126 of scales 105, 122 (respectively), the value 255 is assigned. In other embodiments, the scales 105, 112 and 122 may be divided into other increments. For example, the hue scale 112 may be divided into 360 increments, with one increment for each degree of the 360° disk of hue plane 110.

The luminance axis 104 not only represents the brightness of a pixel, but also what a color pixel would look like following a black and white copy process. Generally, when a black and white copy of a color document is created, the copy attempts to match the luminance components of the original document as closely as possible. The human eye is more sensitive to luminance than hue or saturation, which is why black and white copies still represent original color documents fairly well. In one embodiment of the present invention, when undergoing a black and white copy process for any particular color pixel, first data layer information is retained. The first data layer is represented by luminance information 105. However, second data layer information represented by the color hue information 112 is lost in the final image. Thus, retained information contained in the luminance coordinate space may be referred to as being within a "Preserved Plane" of information, while information contained in the hue coordinate space may be referred to as being within a "Lossy Plane" of information.

Consequently, a two layer color barcode may be produced which contains (1) information in the Preserved Plane 105 and 122, which is retained, and (2) information in the Lossy Plane 112, which is lost, following black and white copying of the color barcode. Dividing the color barcode information into these two planes is done before the barcode is created, either manually or with knowledge of the information content of the different bits. When the color barcode is created, whether by an automated or a manual process, a classification of the information bits into two divisions is performed: (1) bits that need to be preserved during a black and white copy process, (2) bits that will be lost following a black and white copy process. Thus, creation of this two layer color barcode can ensure that certain information is retained in the resulting black and white barcode image.

Figure 2:
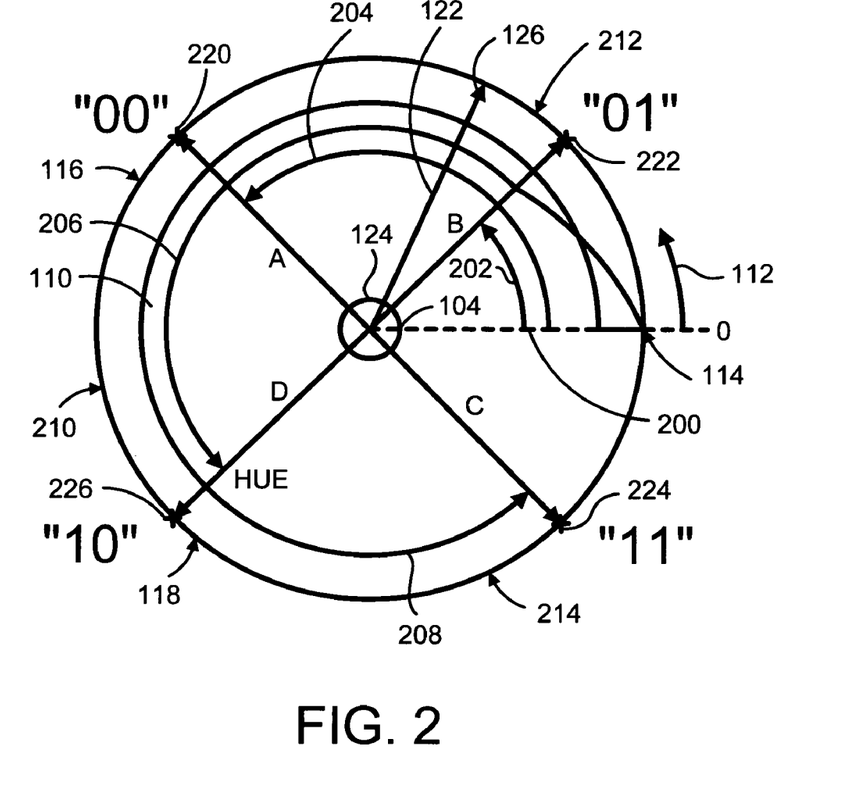
FIG. 2 is a diagram of the hue and saturation portions of the color space of FIG. 1B.

III. Working Example:

FIG. 2 shows one embodiment of using the hue plane 110 for encoding two digit binary barcode data which will appear in the Lossy Plane following photocopying by the black and white copier 60. A zero reference radial 200 has been arbitrarily located in the red region of the hue plane 110, although other locations may be selected. While the circular hue plane 110 may be divided into other increments, such as 360°, for the purposes of binary encoding, the hue plane 110 is divided into 256 increments labeled from zero at the reference radial 200 in a counterclockwise direction. A first arcuate distance 202 has been selected at 16 increments, a second arcuate distance 204 has been selected at 80 increments, a third arcuate distance 206 has been selected at 144 increments, and a final arcuate distance 208 has been selected at 218 increments. While the arcuate distances 202, 204, 206, and 208 are measured counterclockwise from the reference radial 200, clockwise measured arcuate distances may also be used. For reference, the different color regions of the hue plane 110 are: the red region 114, the green region 116, the blue region 118, a cyan region 210, a yellow region 212, and a magenta region 214, with the minimum saturation 124 at the center (gray) and the maximum saturation 126 at the periphery of the circular hue plane.

The two digit binary barcode data are labeled 00, 01, 10 and 11. A radial "A" located at distance 204 terminates at a maximum saturation 220 to represent binary barcode data 00. A radial "B" located at distance 202 terminates at a maximum saturation 222 to represent binary barcode data 01. A radial "C" located at distance 208 terminates at a maximum saturation 224 to represent binary barcode data 11. A radial "D" located at distance 206 terminates at a maximum saturation 226 to represent binary barcode data 10. There is no particular organization used in selecting colors to correspond to the binary digits, as indicated by placing digit 11 between digits 01 and 10; although the illustrated values were selected so that colors which are "close" together also differ in their binary values by as little as possible. As noted further below, there is an error correction capability that may be implemented to correct for errors. Placing "close" binary values on "close" color values reduces the number of errors that may need to be corrected later on since it is desirable for small errors in color interpretation to translate into small (single-bit) errors in the binary values represented by the color. Additionally, the arcuate distances 202, 204, 206 and 208 are located at increments 16, 80, 144 and 218 are not all 90° apart, although they may be and a reasonable separation between the angles may lend to a more easy interpretation. The saturation has been selected to be at the maximum value of 255 along the periphery of the circular hue plane 110.

Figure 3:
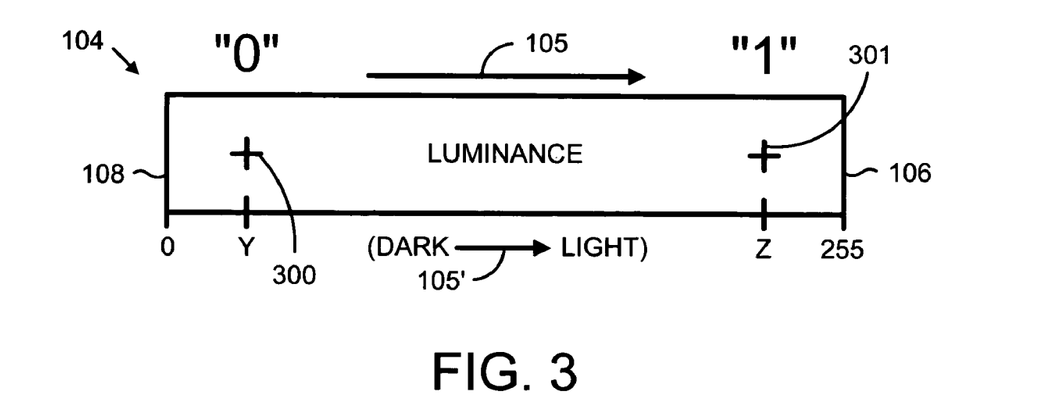
FIG. 3 is a diagram of the luminance portion of the color space of FIG. 1B.

FIG. 3 shows the luminance axis 104 which represents single digit binary barcode data, labeled as either 0 or 1. The luminance axis 104 has a zero value at the minimum end 108 and a value of 255 at the maximum end 106 along the luminance scale 105, as well as along an alternate dark-to-light scale 105'. Near the darker minimum end 108, at a value of 64 (Y), a point 300 has been selected to represent the binary digit 0. Near the lighter maximum end 106, at a value of 196 (Z), a point 301 has been selected to represent the binary digit 1. Luminance scale values other than 64 and 196 may be selected to represent binary digits 0 and 1. In alternate embodiments, binary digit 1 may be located toward the darker end of the luminance scale 105, with digit 0 being located toward the lighter end of scale 105.

While having a fairly wide separation between the values may aid in reading the resulting barcode, the values for points 300 and 301 are also close to the center of scale 105 (near value 128≈½ of 255) so that the hue values are easily read by the barcode reader. Therefore, there is a tradeoff between separation (with 0 and 255 being optimal) and enabling color barcodes to work (with 128 being optimal). To aid in describing the operation of the barcode system 50, letter Y has been assigned to represent the point 300 and binary digit 0, while letter Z represents the point 301 and binary digit 1. Similarly, while for ease of explanation, a power of two (2, 4, 8, etc.) has been selected for the number of colors or luminances, any number of colors or luminances may be chosen, such as three different hue colors.

Now that a set of coordinates has been assigned for the two digit binary data expressed by the hue plane 110 (FIG. 2), and for the single digit binary data expressed by the luminance axis 104 (FIG. 3), an example follows as to how these coordinate assignments may be used to define a color barcode used by encoder 52 and reader 62 (FIG. 1A).

Figure 4:
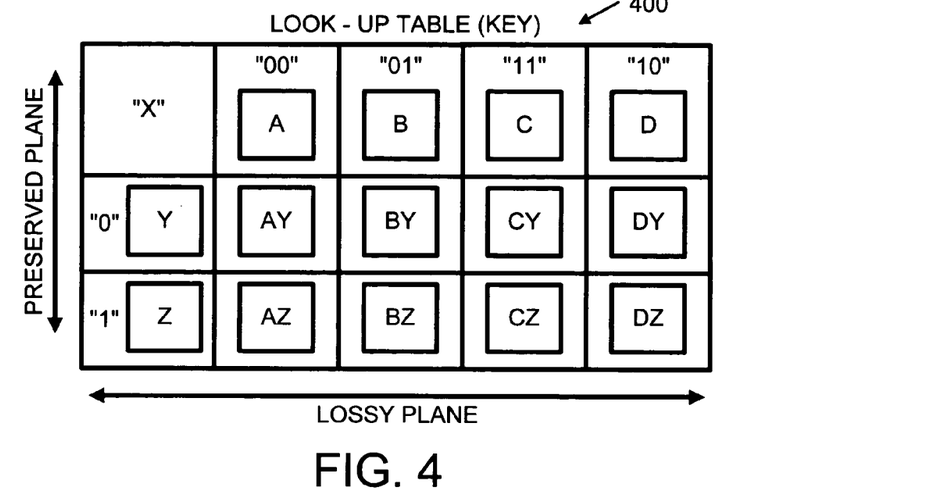
FIG. 4 is a lookup table of one embodiment of the present invention formed using the diagrams of FIGS. 2 and 3.

FIG. 4 shows one embodiment of a lookup table key 400 which may define a barcode system 50 with known characteristics following copying. The key 400 has an X row which contains the basic two digit binary data defined by the hue plane 110 shown in FIG. 2, specifically:
(1) a first column representing binary bit 00 labeled A (green),
(2) a second column representing binary bits 01 labeled B (orange),
(3) a third column representing binary bits 11 labeled C (magenta), and
(4) a fourth column representing binary bits 10 labeled D (blue).

The key 400 also has an X column which contains the basic binary data defined by the luminance axis 104 shown in FIG. 3, specifically:
(1) a first row representing binary bit 0 labeled Y (dark gray), and
(2) a second row representing binary bit 1 labeled Z (light gray).

The remainder of the key 400 is filled in by combining the letters A, B, C and D representing selected colors in the hue plane 110 corresponding to the respective binary bits 00, 01, 11 and 10, with the letters Y and Z corresponding to selected luminance values along the luminance axis 104 corresponding to the respective binary bits 0 and 1. Each of the remaining entries in key 400 represents a single bit of data from the Preserved Plane and a pair of bits from the Lossy Plane. Table 1 below shows this combination of bit data encoded into the Lossy Plane and the Preserved Plane represented by the key 400 by letters representing colors.

TABLE 1

| Letters | Color | Lossy Plane | Preserved Plane |
|---------|-------|-------------|-----------------|
| AY | Dark Green | 00 | 0 |
| BY | Dark Orange | 01 | 0 |
| CY | Dark Magenta | 11 | 0 |
| DY | Dark Blue | 10 | 0 |
| AZ | Light Green | 00 | 1 |
| BZ | Light Orange | 01 | 1 |
| CZ | Light Magenta | 11 | 1 |
| DZ | Light Blue | 10 | 1 |

In other embodiments, if the Lossy Plane information has three or more binary digits per piece of information, additional colors may be selected around the hue plane 110, e.g. by adding letters E, F, G, etc. to label additional radials at the at the additional colors.

Figure 5:
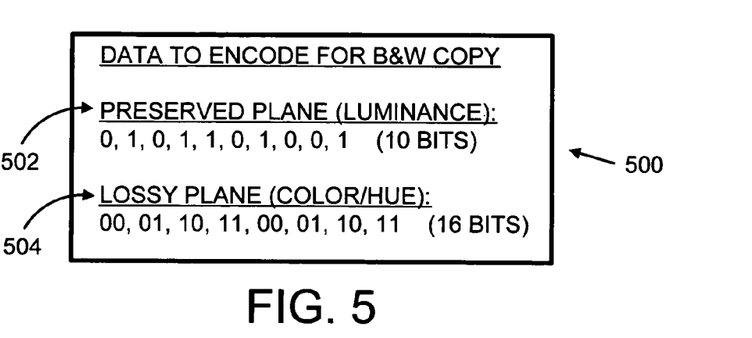
FIG. 5 is a table illustrating one embodiment of data to be encoded.

FIG. 5 shows a table of binary data encoded for a black and white copy 500 to produce a Preserved Plane of data 502 represented by the luminance axis value, and a Lossy Plane of data 504 represented by the hue plane value. Some barcodes may require more information in the Preserved Plane than in the Lossy Plane, or vice versa. To illustrate such situations, the single binary bits of the Preserved Plane are shown as including a total of ten bits, whereas the double binary bits of the Lossy Plane are shown as including a total of 16 bits, resulting in eight bit pairs of data.

Figure 6A:
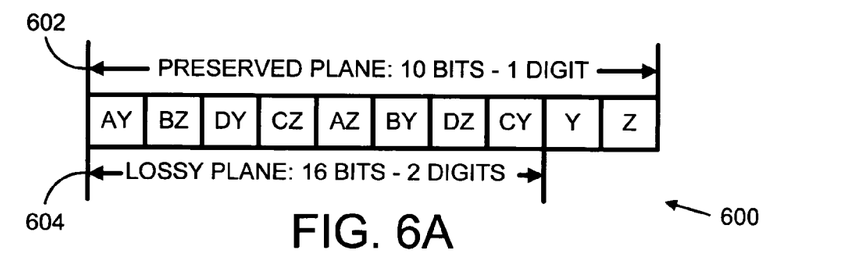
FIG. 6A represents a color barcode resulting from encoding the data of FIG. 5 using the table of FIG. 4.

FIG. 6A shows a color barcode 600 mapped from the data 500 shown in FIG. 5 using the lookup table 400 of FIG. 4. The color barcode 600 shows a ten bit, single-digit ("1 Digit" in FIG. 6A) Preserved Plane of data 602, and a 16 bit, double digit ("2 Digits" in FIG. 6A) Lossy Plane of data 604 represented by ten barcode elements bearing the various colors indicated by the letters A, B, C, D, Y and Z. For example, moving from left to right across the Preserved Plane 502 in FIG. 5, the first digit encountered is 0, which in FIG. 4 is in the Y row, while moving from left to right across the Lossy Plane 504 in FIG. 5, the first pair of digits encountered is 00, which in FIG. 4 is in the A column. The intersection of the Y or 0 row and the A or 00 column is at the AY box of look-up table 400, which is shown in FIG. 6A as the first color. The second digit in the Preserved Plane 502 is 1, which corresponds to the Z row of FIG. 4, while the second pair of digits in the Lossy Plane is 01, which corresponds to the B column in FIG. 4, so the intersection of the Z row and the B column is at the BZ box. The remainder of the information in FIG. 5 is similarly encoded into colors using the look-up table 400, with the resulting colors of the original color barcode 600 being as follows for each of the ten barcode elements thereof. (1) The first barcode element for bits 00,0 is shown as dark green by the letters AY. (2) The second barcode element for bits 01,1 is shown as light magenta by the letters BZ. (3) The third barcode element for bits 10,0 is shown as dark blue by the letters DY. (4) The fourth barcode element for bits 11,1 is shown as light magenta by the letters CZ. (5) The fifth barcode element for bits 00,1 is shown as light green by the letters AZ. (6) The sixth barcode element for bits 01,0 is shown as dark orange by the letters BY. (7) The seventh barcode element for bits 10,1 is shown as light blue by the letters DZ. (8) The eighth barcode element for bits 11,0 is shown as dark magenta by the letters CY. Determination of the ninth and tenth barcode elements is explained further below.

If one plane requires fewer barcode elements than the other plane to represent all bits, then the luminescence coordinates or hue coordinates alone are used to create the color of the extra barcode elements which represent just a single plane. These single plane color entries are denoted by the X column and X row of key 400.

For example, the ninth and tenth barcode elements of the color barcode 600 representing the ninth and tenth bits of Preserved Plane data, for which there is no corresponding information for the Lossy Plane data, are handled by using information based on that in the X column of lookup table key 400. In this case, to more readily identify Preserved Plane data which has no corresponding Lossy Plane data, the digit 0 is set to the minimum luminance value of zero on the luminance scale 105 corresponding to the color black, while the digit 1 is set to the maximum luminance value of 255 on scale 105 corresponding to the color white. The saturation is set at the minimum value of zero located at the center of the hue plane 110. Thus, for the final colors of the color barcode 600: (9) the ninth barcode element for bit 0 is shown as black, indicated by the single letter Y; and (10) the tenth barcode element for bit 0 is shown as white, indicated by single letter Z.

If instead, the Lossy Plane had more sets of bit pairs than the number of bits in the Preserved Plane, the colors in the X column are used: green (A) for 00, orange (B) for 01, magenta (C) for 11, and blue (D) for 10. In this case, to more readily identify the Lossy Plane data which has no corresponding Preserved Plane data, the luminance is set at one-half of the maximum value, which is 128 on the luminance scale 105. The saturation is set at the maximum value 255 along the saturation scale 122 (FIG. 2), located at the periphery of the hue plane 110. In other embodiments, other saturation values may be used for the luminescence and hue.

Where bits in both Lossy and Preserved Planes are being represented, the minimum and maximum luminance values are not chosen since hue information is undetectable because regardless of the hue, the minimum and maximum luminance values both print and read as black and white, respectively. Therefore, when creating the mapping of bits to barcode element colors, the luminance and hue coordinates are chosen independent of each other.

Figure 6B:
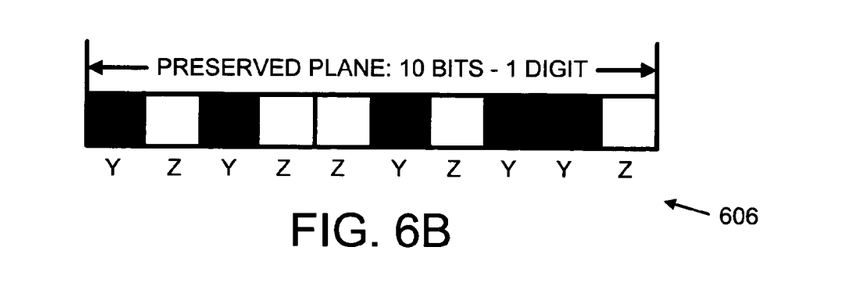
FIG. 6B is a black and white barcode resulting from copying the color barcode of FIG. 6A with a black and white copier

FIG. 6B shows a black and white (or dark gray and light gray) barcode 606 which is produced following black and white copying of the color barcode 600 using a black and white copier. Only the Y and Z information of the Preserved Plane 502 remains, while the A, B, C, D information of the Lossy Plane no longer is represented.

Thus, the lookup table key 400 is used to create a mapping from bits to barcode element colors such that information in the Preserved Plane survives the black and white copy process of copier 60. Using the hue and luminance coordinates determined by the bits to be stored in the barcode, together with the maximum saturation value, each element in the barcode is assigned a color location by the hue, saturation and luminance coordinates in the full color space 100.

IV. Method of Encoding a Color Barcode With Plural Data Layers

Figure 7:
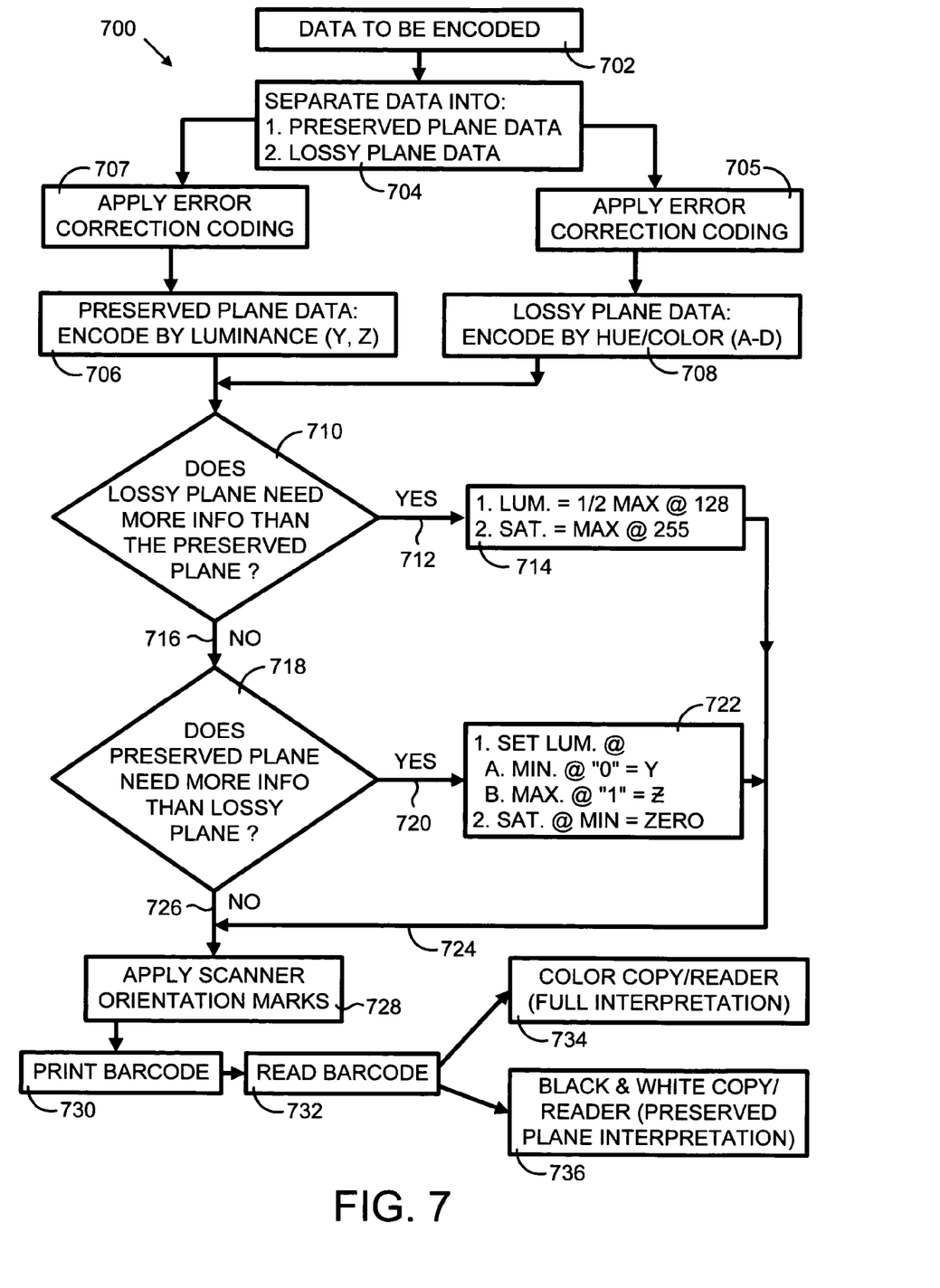
FIG. 7 is a flowchart of one embodiment of a method of the present invention.

FIG. 7 is a flowchart of one embodiment of a method of encoding a color barcode 700 so that following black and white copying, the copied barcode has known characteristics so that some information from the original color barcode remains available for reading. First, the data to be encoded 702 undergoes a separation action 704 where the data is separated into Preserved Plane data and Lossy Plane data. Each of these Planes then has error correction coding applied to them separately (705 and 707). Separate error coding is used because if the two planes were error correction coded together, the number of errors occurring after a black and white copy process by copier 60 may overwhelm current state-of-the-art channel coders. Error Correction coding methods are known to those with ordinary skill in the art. The same error correction routine or different methods may be used in steps 705 and 707.

After error correction coding, in one encoding action 706, the Preserved Plane data is encoded by luminance into Y and Z coordinates, for instance using the luminance axis 104 (FIGS. 1 and 3) and lookup table key 400 of FIG. 4. In another encoding action 708, the Lossy Plane data is encoded by hue/color, for instance into A, B, C or D coordinates using the hue plane 110 of FIG. 2 at the maximum or other saturation(s). For example, in other embodiments a radial selected at the color yellow may need to be at full saturation for use by a color barcode reader, whereas a radial selected at the color purple may convey such information at a partial saturation.

The data assigned to color values output from operation 706 and 708 are delivered to a first comparison operation 710. In the first comparison operation 710 it is determined whether the Lossy Plane data needs more information, or barcode elements, than the Preserved Plane data. If so, then a YES signal 712 is issued to a first luminance and saturation adjustment operation 714. In operation 714, the luminance is adjusted to one-half of the maximum ("max") value of 255, which is rounded off to 128, although in other embodiments other adjustments may be made. Operation 714 also, if needed, adjusts the saturation to the maximum value of 255. If the first comparison operation 710 determines the Lossy Plane data does not need more information (barcode elements) than the Preserved Plane data, then a NO signal 716 is issued to a second comparison operation 718.

A second comparison operation 718 determines whether the Preserved Plane data needs more information, or barcode elements, than the Lossy Plane data. If so, then a YES signal 720 is issued to a second luminance and saturation adjustment operation 722. In operation 722, the luminance is set at the minimum ("min") value of zero on the 0–255 luminance scale 105 to represent the binary digit 0 ("Y"). For the binary digit 1 ("Z"), the luminance is set at the maximum value of 255 on scale 105. Operation 722 adjusts the saturation to the minimum value of zero on the 0–255 saturation scale 122. If the second comparison operation 718 determines the Preserved Plane does not need more information (barcode elements) than the Lossy Plane, a NO signal 726 is issued.

After the first and second adjustment operations 714 and 722, an adjusted luminance and saturation signal 724 (if any) and the NO signal 726 are combined into combined data as indicated by their intersection in FIG. 7. This combined data is delivered to an apply scanner orientation marks operation 728, which may also me referred to as a correction routine. The markings applied in operation 728 are used by the scanner of the bar code reader 62 for orientation to the barcode. For example, the scanner needs to know where the top right, bottom left, etc of the barcode are located so markings are added to the outside of the barcode to allow the scanner to properly orient reading of the barcode.

Following application of the correction or check routine in operation 728, in a printing operation 730 the original color barcode is printed, for instance barcode 600 of FIG. 6. The color barcode may be read in an optional reading operation 732 to interpret all of the data in both the Lossy and Preserved Planes, or perhaps as a quality check to determine accuracy of the original color barcode. Alternatively, the original color barcode may be subjected to a color copying and reading operation 734, where a color image of the barcode is produced by copying, and then read by a color reader for a full interpretation of both the Lossy and Preserved planes of data. In another embodiment, the original color barcode may be subjected to a black and white copying and reading operation 736. In operation 736, a black and white barcode copier 60 photocopies the original color barcode to produce a black and white image which is then read by a black and white barcode reader for interpretation of only the Preserved Plane of data. In other embodiments, the color barcode, either the original or a color copy, may be read by a black and white barcode reader to extract only information in the Preserved Plane of data.

The operations of method 700 may be carried out by the color barcode data encoder 52 using various software, hardware or firmware portions of the encoder, or various combinations thereof.

VI. Conclusion

Thus, a two-dimensional color barcode with preserved and lossy plane layers allows predefined information to be maintained following black and white copying. As such, high density information storage with storage for several bits of information within each element of the barcode is achieved with color barcodes created in accordance with the present invention. The barcode system can be created with an associated lookup table key 400 with the Preserved Plane information retained following black and white copying by copier 60 for later interpretation by reader 62. This encoding system allows a two-dimensional color barcode to be created that retains useful information following the black and white copy process.

The foregoing has described the principles, embodiments and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

The invention claimed is:

1. A barcode system, comprising:
   an encoder configured to create a two-dimensional color barcode representing data defined by a first data layer containing first data and having first information loss characteristics and a second data layer containing second data and having second information loss characteristics;
   wherein the first information loss characteristics are configured to preserve the first data and the second information loss characteristics are configured to lose the second data during black and white copying of the color barcode.

2. The barcode system of claim 1, wherein a black and white barcode image is created from a the black and white copying of the first and second layers.

3. The barcode system of claim 2, wherein a barcode reader is configured to read and interpret the data that is preserved.

4. The barcode system of claim 1, wherein the encoder generates combined data by encoding the data which is preserved according to selected luminance values.

5. The barcode system of claim 4, wherein the encoder generates the combined data by encoding the data which is lost according to selected color hues.

6. The barcode system of claim 4, wherein the encoder generates the combined data by encoding the data which is lost according to selected color hues at selected saturations.

7. The barcode system of claim 1, wherein the color bar code comprises plural separate barcode elements each containing a portion of at least one of (a) the data which is lost and (b) the data which is preserved.

8. The barcode system of claim 7, wherein for each barcode element containing a portion of only one of (a) the data which is lost and (b) the data which is preserved, the encoder adjusts the luminance value thereof.

9. The barcode system of claim 7, wherein the color for each barcode element containing a portion of both (a) the data which is lost and (b) the data which is preserved is selected to print as a combined color.

10. The barcode system of claim 1, wherein the encoder generates the combined data as plural barcode elements each having an assigned location in a color space.

11. The barcode system of claim 10, wherein each barcode element assigned location is defined in terms of values assigned along the luminance axis, one of the plural hue planes, and one of the plural radial saturation axes.

12. The barcode system of claim 11, wherein the values assigned along the luminance axis are 0–255, the values assigned round each of the plural hue planes are 0–255, and the values assigned along each of the plural radial saturation axes are 0–255.

13. The barcode system of claim 1, further comprising a color printer configured to print a two-dimensional color barcode with the first and second data layers.

14. A barcode system, comprising:
   means for separating barcode data into a first data layer having first information loss characteristics and containing first to a second data layer having first information loss characteristics and containing second data, wherein based on the first and second loss characteristics, the first data is preserved and the second data is lost following black and white copying;
   means for generating a signal from the first data which is preserved and the second data which is lost; and
   means for printing a color barcode in response to the signal.

15. The barcode system of claim 14, further comprising means for copying the color barcode to produce a black and white barcode image thereof.

16. The barcode system of claim 15, further comprising means for reading and the data which is preserved from the black and white barcode image.

17. The barcode system of claim 14, further comprising means for defining the data which is preserved according to luminance, and means for defining the data which is lost according to hue.

18. The barcode system of claim 14, further comprising means for assigning the data which is preserved and the data which is lost locations in a color space from which the means for generating generates the signal in response thereto.

19. The barcode system of claim 14, wherein the means for generating generates a signal comprising plural barcode elements of the color barcode at least one of which comprises a portion of both the data which is preserved and the data which is lost.

20. The barcode system of claim 19, wherein at least one of the plural barcode elements comprises a portion of only one of the data which is preserved and the data which is lost, and the barcode system further comprises means for adjusting the luminance thereof.

21. The barcode system of claim 14, further comprising means for reading and interpreting only the data which is preserved from the printed color barcode.

22. A color barcode data encoder, comprising:
   a data separator which separates data to be encoded into preserved plane data and lossy plane data, wherein the preserved plan data has first information loss characteristics and contains first data and the lossy plane data has second information loss characteristics and contains second data;
   a first data encoder which encodes the preserved plane data by luminance to generate a luminance output, wherein based on the first loss information characteristics, the first data is preserved during black and white copying;

a second data encoder which encodes the lossy plane data by hue to generate a hue output, wherein based on the second loss characteristics the second data is lost during black and white copying; and a color barcode output generator which generates an output signal in response to the luminance output and hue output.

23. The color barcode data encoder of claim 22, wherein the output signal comprises plural barcode elements each comprising a portion of at least one of the luminance output and the hue output.

24. The color barcode data encoder of claim 23, wherein at least one of the plural barcode elements comprises single data which comprises a portion of only one of the luminance output and the hue output.

25. The color barcode data encoder of claim 24, further comprising a luminance adjuster which adjusts a luminance value of the single data.

26. The color barcode data encoder of claim 22, wherein the output signal comprises plural barcode elements, and further comprising a comparator which determines whether or not the luminance output and hue output use the same number of barcode elements.

27. A method of producing a barcode, comprising:
separating data to be encoded into a first data layer having first information loss characteristics and containing first data and a second data layer having second information loss characteristics and containing second data, wherein the first loss characteristics are configured to preserve the first data and the second loss characteristics are configured to lose the second data following black and white copying;
combining the separated data to generate a signal; and
printing a color barcode in response to the signal.

28. The method of claim 27, further comprising:
encoding the data, which is preserved by luminance; and
encoding the data which is lost by hue;
wherein the combining comprises combining the data encoded by luminance with the data encoded by hue to generate the signal.

29. The method of claim 27, wherein the combining further comprises generating a signal defining plural barcode elements each of which comprises a portion of at least one of the data which is preserved and the data which is lost.

30. The method of claim 29, further comprising:
determining whether one of the plural barcode elements comprises single data comprising a portion of only one of the data which is preserved and the data which is lost; and
adjusting the luminance of the single data.

31. The method of claim 30, wherein the single data comprises data which is lost, and wherein the adjusting further comprises adjusting saturation to maximum.

32. The method of claim 30, wherein the single data comprises data which is preserved, the adjusting further comprises adjusting saturation to minimum.

33. The method of claim 27, further comprising assigning locations in a full color space to the data which is preserved in the data which is lost.

34. The method of claim 27, further comprising:
copying the printed color barcode to generate a black and white barcode image thereof; and
reading and interpreting only the data which is preserved from the black and white barcode image.

35. The method of claim 27, further comprising reading and interpreting only the data which is preserved from the printed color barcode.

* * * * *

UNITED STATES PATENT AND TRADEMARK OFFICE
CERTIFICATE OF CORRECTION

PATENT NO. : 7,118,041 B2 Page 1 of 1
APPLICATION NO. : 10/833589
DATED : October 10, 2006
INVENTOR(S) : Clark Taylor It is certified that error appears in the above-identified patent and that said Letters Patent is hereby corrected as shown below:

In column 9, line 39, in Claim 2, after "from" delete "a".

In column 10, line 17, in Claim 14, delete "to a" and insert -- data and a --, therefor.

In column 10, line 59, in Claim 22, delete "plan" and insert -- plane --, therefor.

In column 11, line 3, in Claim 22, after "characteristics" insert -- , --.

In column 12, line 2, in Claim 28, after "data" delete ",".

Signed and Sealed this

Sixteenth Day of December, 2008

JON W. DUDAS
*Director of the United States Patent and Trademark Office*